United States Patent
Osada

(10) Patent No.: US 8,041,758 B2
(45) Date of Patent: Oct. 18, 2011

(54) MULTIPLIER AND ARITHMETIC UNIT

(75) Inventor: Takashi Osada, Kofu (JP)

(73) Assignee: NEC Computer Techno, Ltd., Yamanashi (JP)

( * ) Notice: Subject to any disclaimer, the term of this patent is extended or adjusted under 35 U.S.C. 154(b) by 1273 days.

(21) Appl. No.: 11/709,784

(22) Filed: Feb. 23, 2007

(65) Prior Publication Data

US 2007/0203964 A1    Aug. 30, 2007

(30) Foreign Application Priority Data

Feb. 23, 2006   (JP) .................................. 2006-046184

(51) Int. Cl.
  *G06F 7/44*     (2006.01)
  *G06F 7/52*     (2006.01)
  *G06F 1/00*     (2006.01)
(52) U.S. Cl. .......................... 708/503; 708/625; 713/324
(58) Field of Classification Search .................. 708/503, 708/513, 516, 625; 713/324
See application file for complete search history.

(56) References Cited

U.S. PATENT DOCUMENTS

| | | | | |
|---|---|---|---|---|
| 5,987,616 A | * | 11/1999 | Suzuki ........................... | 713/320 |
| 2005/0066205 A1 | * | 3/2005 | Holmer ......................... | 713/320 |

FOREIGN PATENT DOCUMENTS

| | | |
|---|---:|---|
| JP | 61-49234 | 3/1986 |
| JP | 5-40605 | 2/1993 |
| JP | 5-150870 | 6/1993 |
| JP | 07-248895 | 9/1995 |
| JP | 9-114639 | 5/1997 |
| JP | 09-311779 | 12/1997 |
| JP | 10-333886 | 12/1998 |
| JP | 11-272450 | 10/1999 |

* cited by examiner

*Primary Examiner* — Chuong D Ngo
(74) *Attorney, Agent, or Firm* — Young & Thompson

(57) ABSTRACT

A multiplier has a multiplication array in which partial products are generated by performing multiplication between a multiplier and a multiplicand, and a partial product control circuit which generates an enable signal for activating an effective region in the multiplication array corresponding to effective figures of the multiplier and the multiplicand. The effective figures depend on the format of the multiplier and the multiplicand. The partial product control circuit controls the status of the enable signal according to a multiplication command designating the format. The multiplication array is constituted by a dynamic circuit. The dynamic circuit in an initial stage of the multiplication array has a switch which is turned on/off by the enable signal. When the enable signal is ineffective, the switch is turned off and a discharging operation in the dynamic circuit is stopped.

13 Claims, 9 Drawing Sheets

[ENABLE SIGNAL] = [ MULTIPLICATION COMMAND ] × [MASK bit]

$$ENB-a = \{64\text{-bit FIXED POINT} + 32\text{-bit FIXED POINT} + \text{DOUBLE-PRECISION FLOATING POINT} + \text{SINGLE-PRORCISION FLOATING POINT}\} \times (0.1)$$

$$ENB-b = \{64\text{-bit FIXED POINT} + 32\text{-bit FIXED POINT} + \text{DOUBLE-PRECISION FLOATING POINT}\} \times (0.1)$$

$$ENB-c = \{64\text{-bit FIXED POINT} + \text{DOUBLE-PRECISION FLOATING POINT}\} \times (0.1)$$

$$ENB-d = \{64\text{-bit FIXED POINT}\} \times (0.1)$$

FIG. 11

MULTIPLIER AND ARITHMETIC UNIT

BACKGROUND OF THE INVENTION

1. Field of the Invention

The present invention relates to an arithmetic unit which performs arithmetic operations on data and, more particularly, to a multiplier which performs multiplication on data.

2. Description of the Related Art

In computers, floating point numbers and fixed point numbers are handled. Arithmetic units for performing operations on floating point numbers and fixed point numbers are known. An arithmetic unit for performing multiplication among such arithmetic units is called a multiplier. Conventional arts described below are known as arts relating to arithmetic units and multipliers.

Japanese Patent Laid-Open No. 61-49234 discloses a floating-point multiplication circuit designed to efficiently execute multiplication of integers as well as multiplication of floating point numbers. According to the technique disclosed in Japanese Patent Laid-Open No. 61-49234, integer data is expressed in floating-point form such that the most significant bit of a mantissa part is 0. This technique eliminates any special discrimination between integer data and floating point number data and enables these two kinds of data to be handled in a unifying manner.

Japanese Patent Laid-Open No. 5-40605 discloses a floating-point multiplier which performs multiplication of fixed point numbers and non-normalized floating point numbers as well as normalized floating point numbers. For example, a fixed point number is shifted by the number of successive 0s from the most significant bit by a left shifter and thereafter provided to a multiplication circuit for performing multiplication of normalized floating point numbers. Also, the sum of the amount of shift of a multiplier and the amount of shift of a multiplicand is computed by an adder. The multiplication result output from the multiplication circuit is shifted by the amount corresponding to the sum of the amounts of shift by a right shifter.

Japanese Patent Laid-Open No. 10-333886 discloses a technique with the objective to reduce the scale of a floating-point multiplication circuit. The floating-point multiplication circuit has a multiplier for performing multiplication between a mantissa part of a first value and a second mantissa part of a second value. The multiplier obtains partial products by means of a second-order booth decoder and a selector. The obtained partial products are added in an array manner.

Japanese Patent Laid-Open No. 5-150870 discloses a technique with the objective to reduce the power consumption of an arithmetic circuit in a digital signal processor (DSP) The arithmetic circuit has a plurality of functional blocks, a plurality of switches and a control block. The plurality of switches turn on/off clock signals supplied to the plurality of functional blocks. The control block controls each switch to control the supply of the clock signal to the corresponding functional block.

Japanese Patent Laid-Open No. 9-114639 discloses a bit field operation circuit in a microprocessor. The bit field operation circuit has a mask data generation circuit and performs a bit field operation by using mask data output from the mask data generation circuit. The mask data generation circuit has a mask bit generation circuit and a shifter. The shifter shifts a mask bit output from the mask bit generation circuit by an amount corresponding to predetermined bits, and outputs the mask bit as mask data to an arithmetic unit.

SUMMARY OF THE INVENTION

An object of the present invention is to provide a technique to reduce the power consumption of a multiplier or an arithmetic unit.

The present invention will be described by using numerals and characters used in the description of the preferred embodiments of the present invention. The numerals and characters are shown below in parentheses to clarify the correspondence between the description in the appended claims and the description of the preferred embodiments of the present invention. However, the numerals and characters are not to be used for interpretation of the technical scope of the present invention described in the appended claims.

According to a first aspect of the present invention, there is provided a multiplier having a multiplication array (41), an adder (44, 7, 8) and a partial product control circuit (42). In the multiplication array (41), partial products are generated by performing multiplication between an n-bit multiplier (n: a natural number) and an n-bit multiplicand. The adder (44, 7, 8) adds the generated partial products together. The partial product control circuit (42) generates an enable signal (ENB-a to ENB-d) for activating an effective region (Re) in the multiplication array (41) corresponding to effective figures of the multiplier and the multiplicand. The effective figures depend on the format of the multiplier and the multiplicand. The partial product control circuit (42) controls the status of the enable signal (ENB-a to ENB-d) according to a multiplication command (MC) designating the format.

The multiplication array (41) is constituted by a dynamic circuit. The dynamic circuit in an initial stage of the multiplication array (41) has a switch (23) which is turned on/off by the enable signal (ENB-a to ENB-d). When the enable signal (ENB-a to ENB-d) is ineffective, the switch (23) is turned off and a discharging operation in the dynamic circuit is stopped.

The enable signal (ENB-a to ENB-d) comprises a first enable signal by which a first region in the multiplication array (41) is activated and a second enable signal by which a second region in the multiplication array (41) is activated. If the format of the multiplier and the multiplicand is a first format, the effective region (Re) is the first region. Accordingly, the partial product control circuit (42) sets the first enable signal effective and sets the second enable signal ineffective. If the format of the multiplier and the multiplicand is a second format, the effective region (Re) is the first region and the second region. Accordingly, the partial product control circuit (42) sets the first and second enable signals effective.

The above-described format comprises a single-precision floating-point form, a double-precision floating-point form, a 32-bit fixed-point format and a 64-bit fixed-point form.

The multiplier according to the present invention further has a mask register (3) storing a mask bit (MASK) designating effectiveness/ineffectiveness of the multiplication. In this case, the partial product control circuit (42) controls the status of the enable signal (ENB-a to ENB-d) on the basis of the multiplication command (MC) and the mask bit (MASK), and sets the entire enable signal (ENB-a to ENB-d) ineffective if the mask bit (MASK) designates ineffectiveness.

The multiplier according to the present invention further has a first register (1) in which a first operand (OP1) is stored, a second register (2) in which a second operand (OP2) is stored, a first preprocessing circuit (5), and a second preprocessing circuit (5). The first preprocessing circuit (5) divides the first operand (OP1) into an exponential part (EXP1) and a mantissa part (MNT1) according to the multiplication command (MC), and outputs the mantissa part (MNT1) as the multiplier to the multiplication array (41).

The second preprocessing circuit (5) divides the second operand (OP2) into an exponential part (EXP2) and a mantissa part (MNT2) according to the multiplication command (MC), and outputs the mantissa part (MNT2) as the multiplicand to the multiplication array (41).

The first register (1), the second register (2) and the mask register (3) may be vector registers in which vector data is stored. In such a case, the first operand (OP1) is each of items of first vector data stored in the first register (1). The second operand (OP2) is each of items of second vector data stored in the second register (2). The mask bit (MASK) is each of items of vector mask data stored in the mask register (3) and associated with the first operand (OP1) and the second operand (OP2).

The multiplier according to the present invention further has a selection circuit (12) which receives an output from the adder (44, 7, 8) and the mask bit (MASK). The selection circuit (12) generates result data (RES) indicating the result of multiplication between the first operand (OP1) and the second operand (OP2) on the basis of the output from the adder (44, 7, 8), and sets the value of the result data (RES) to 0 if the mask bit (MASK) designates ineffectiveness.

The above-described adder may comprise a fixed-point adder (8) which adds together the partial products in fixed-point form, and a floating-point adder (7) which adds together the partial products in floating-point form. The selection circuit (12) further receives the multiplication command (MC). The selection circuit (12) selects one of outputs from the fixed-point adder (8) and the floating-point adder (7) according to the multiplication command (MC), and generates the result data (RES) on the basis of the selected output if the mask bit (MASK) designates effectiveness.

According to a second aspect of the present invention, there is provided a multiplier having a multiplication array (41), an adder (44, 7, 8), a mask register (3) and a partial product control circuit (42). In the multiplication array (41), partial products are generated by performing multiplication between a multiplier and a multiplicand. The adder (44, 7, 8) adds the generated partial products together. The mask register (3) stores a mask bit (MASK) designating effectiveness/ineffectiveness of the multiplication. The partial product control circuit (42) controls the status of an enable signal (ENB-a to ENB-d) for activating the multiplication array (41) on the basis of the mask bit (MASK). The partial product control circuit (42) sets the enable signal (ENB-a to ENB-d) ineffective if the mask bit (MASK) designates ineffectiveness. The multiplication array (41) is constituted by a dynamic circuit. The dynamic circuit in an initial stage of the multiplication array (41) has a switch (23) which is turned on/off by the enable signal (ENB-a to ENB-d). When the enable signal (ENB-a to ENB-d) is ineffective, the switch (23) is turned off and a discharging operation in the dynamic circuit is stopped.

The multiplier according to the present invention further has a first register (1) in which a first operand (OP1) is stored, a second register (2) in which a second operand (OP2) is stored, a first preprocessing circuit (5) and a second preprocessing circuit (5) The first preprocessing circuit (5) outputs a mantissa part (MNT1) of the first operand (OP1) as the multiplier to the multiplication array (41). The second preprocessing circuit (5) outputs a mantissa part (MNT2) of the second operand (OP2) as the multiplicand to the multiplication array (41). The first register (1), the second register (2) and the mask register (3) are vector registers in which vector data is stored. The first operand (OP1) is each of items of first vector data stored in the first register (1). The second operand (OP2) is each of items of second vector data stored in the second register(2). The mask bit (MASK) is each of items of vector mask data stored in the mask register (3) and associated with the first operand (OP1) and the second operand (OP2).

According to a third aspect of the present invention, there is provided an arithmetic unit having a first register (1) in which a first operand (OP1) is stored, a second register (2) in which a second operand (OP2) is stored, an arithmetic device (102, 103) which performs an operation by using the first operand (OP1) and the second operand (OP2), and an operation control circuit (101) which generates an enable signal (ENB) for activating an effective region (Re) in the arithmetic device (102, 103) corresponding to effective figures of the first operand (OP1) and the second operand (OP2) The effective figures depend on the format of the first operand (OP1) and the second operand (OP2). The operation control circuit (101) controls the status of the enable signal (ENB) according to an operation command (OC) designating the format.

The above-described arithmetic device (102, 103) is constituted by a dynamic circuit. The dynamic circuit in an initial stage of the arithmetic device (102, 103) has a switch (23) which is turned on/off by the enable signal (ENB). When the enable signal (ENB) is ineffective, the switch (23) is turned off and a discharging operation in the dynamic circuit is stopped.

The arithmetic unit according to the present invention may further has a mask register (3) storing a mask bit (MASK) designating effectiveness/ineffectiveness of the operation. In this case, the operation control circuit (101) controls the status of the enable signal (ENB) on the basis of the operation command (OC) and the mask bit (MASK). In particular, when the mask bit (MASK) designates ineffectiveness, the operation control circuit (101) sets the enable signal (ENB) ineffective.

The first register (1) the second register (2) and the mask register (3) may be vector registers in which vector data is stored. In such a case, the first operand (OP1) is each of items of first vector data stored in the first register (1). The second operand (OP2) is each of items of second vector data stored in the second register (2). The mask bit (MASK) is each of items of vector mask data stored in the mask register (3) and associated with the first operand (OP1) and the second operand (OP2).

According to the present invention, the statuses of the plurality of types of enable signals are controlled according to the operation command and the mask bit to enable the unused region in the arithmetic device, e.g., a multiplication array to be deactivated according to the format of the operand. More specifically, the discharging operation in the initial-stage dynamic circuit in the unused region can be completely stopped. Further, the operation of the dynamic circuits following the initial-stage dynamic circuit in which the discharging operation is stopped can also be inhibited. Therefore, the power consumption of the arithmetic unit handling a plurality of formats is reduced.

BRIEF DESCRIPTION OF THE DRAWINGS

FIG. 11 is a diagram showing an enable signal according to the embodiment;

DETAILED DESCRIPTION OF THE PREFERRED EMBODIMENTS

A multiplier according to an embodiment of the present invention will be described with reference to the accompanying drawings. The multiplier according to the embodiment of the present invention is a vector multiplier which has a vector multiplication function, and which performs multiplication on vector data. The vector multiplier according to the embodiment supports a plurality of data formats and executes a floating-point operation and a fixed-point operation with one piece of hardware.

1. Outline of Configuration

Figure 1:
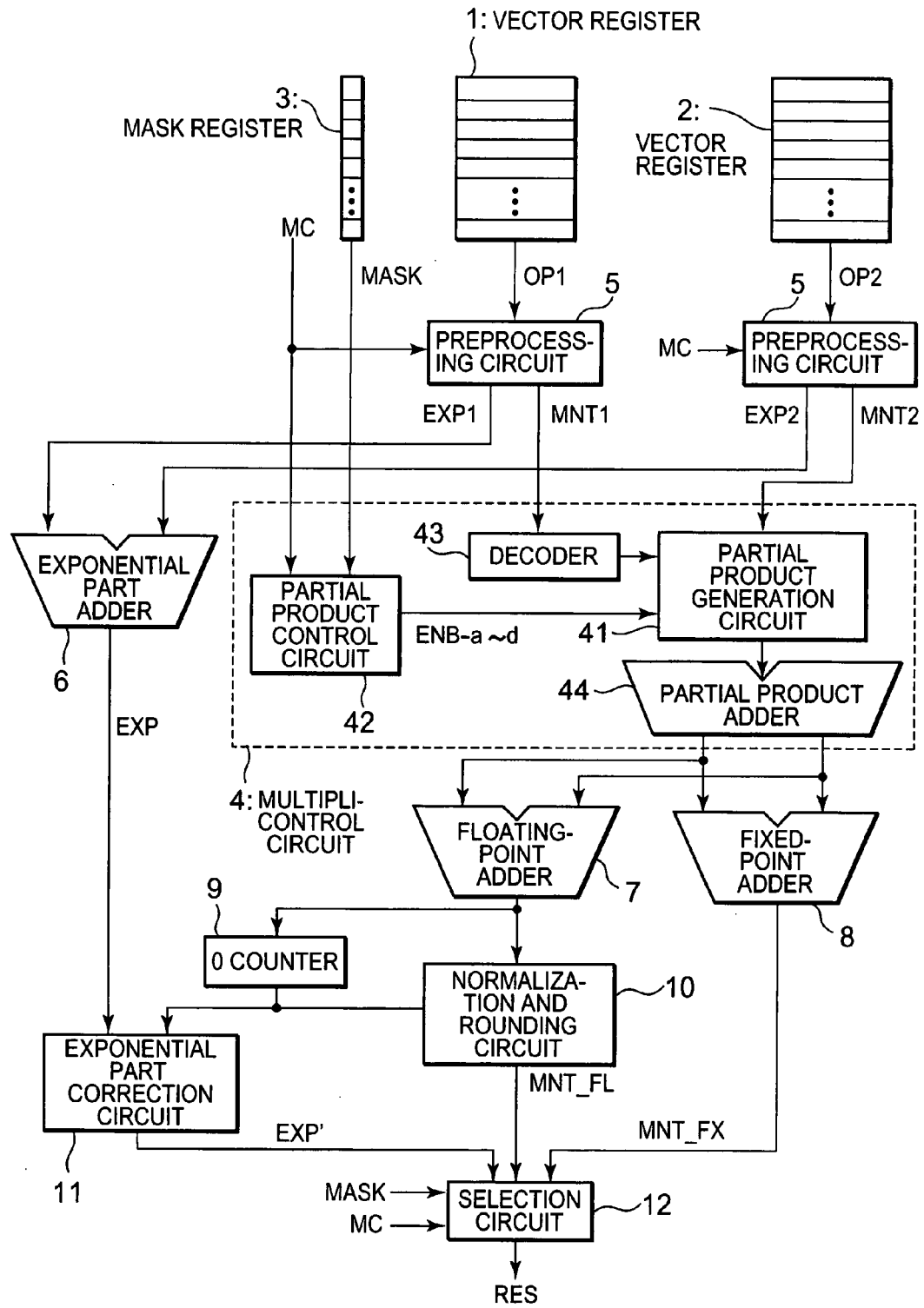
FIG. 1 is a block diagram showing the configuration of a vector multiplier according to an embodiment of the present invention.

FIG. 1 is a block diagram showing the configuration of the vector multiplier according to the embodiment. The vector multiplier according to the embodiment has a vector register 1, a vector register 2, a mask register 3, a multiplication circuit 4, two preprocessing circuits 5, an exponential part adder 6, a floating-point adder 7, a fixed-point adder 8, a 0 counter 9, a normalization and rounding circuit 10, an exponential part correction circuit 11 and a selection circuit 12.

The vector register 1 is connected to one of the preprocessing circuits 5. Items of first vector data on which multiplication is to be performed are stored in the vector register 1. Each of the items of first vector data is a first operand OP1. The items of the first vector data are successively output to the preprocessing circuit 5. The vector register 2 is connected to the other preprocessing circuit 5. Items of second vector data on which multiplication is to be performed are stored in the vector register 2. Each of the items of second vector data is a second operand OP2. The items of the second vector data are successively output to the other preprocessing circuit 5. The format of each operand comprises, for example, four formats: the double-precision and single-precision floating-point forms in accordance with IEEE, and 64-bit and 32-bit fixed-point forms.

According to the embodiment, each of multiplications of the first operand OP1 and the second operand OP2 is made effective/ineffective. Therefore, a mask bit MASK indicating the effectiveness/ineffectiveness of each multiplication is prepared and vector mask data, which is a series of mask bits MASK, is stored in the mask register 3.

More specifically, the mask register 3 is a vector register, and vector mask data, which is vector data, is stored in the mask register 3. The number of items of the vector mask data is the same as the number of items of the above-described first vector data or second vector data. Each of mask bits MASK which are the items of the vector mask data is associated with the corresponding one of the items of the first and second vector data (first operand OP1 and second operand OP2) to specify the effectiveness/ineffectiveness of multiplication of the item. For example, a mast bit MASK "1" specifies the effectiveness of multiplication, and a mask bit MASK "0" specifies the ineffectiveness of multiplication. The mask register 3 is connected to the multiplication circuit 4 and to the selection circuit 12. The mask bit MASK is referenced by the multiplication circuit 4 and the selection circuit 12.

Each preprocessing circuit 5 is connected to the vector register 1 or 2, the multiplication circuit 4 and the exponential part adder 6. The preprocessing circuit 5 receives the operand from the vector register and receives a "multiplication command MC" designating the format of the operand from a predetermined controller (not shown). The preprocessing circuit 5 divides the received operand into an exponential part and a mantissa part according to the format indicated by the multiplication command MC. For example, the preprocessing circuit 5 connected to the vector register 1 divides the first operand OP1 into a first exponential part EXP1 and a first mantissa part MNT1 and outputs the first exponential part EXP1 and the first mantissa part MNT1 to the exponential part adder 6 and the multiplication circuit 4, respectively. Also, the preprocessing circuit 5 connected to the vector register 2 divides the second operand OP2 into a second exponential part EXP2 and a second mantissa part MNT2 and outputs the second exponential part EXP2 and the second mantissa part MNT2 to the exponential part adder 6 and the multiplication circuit 4, respectively. Each of the exponential parts EXP1 and EXP2 includes a sign and an exponent.

The multiplication circuit 4 is connected to the mask register 3, the preprocessing circuit 5, the floating-point adder 7 and the fixed-point adder 8. The multiplication circuit 4 receives from the preprocessing circuits 5 the first mantissa part MNT1 as a multiplier and the second mantissa part MNT2 as a multiplicand. The multiplication circuit 4 then performs multiplication between the multiplier and the multiplicand and outputs the result of the multiplication to the floating-point adder 7 and the fixed-point adder 8. More specifically, the multiplication circuit 4 has a partial product generation circuit 41, a partial product control circuit 42, a decoder 43 and a partial product adder 44. The decoder 43 again encodes the first mantissa part MNT1 and outputs the encoded first mantissa part MNT1 as a multiplier to the partial product circuit 41. The partial product circuit 41 performs multiplication between an n-bit multiplier (first mantissa part MNT1) and an n-bit multiplicand (second mantissa part MNT2) to generate an n number of partial products. The number n is a natural number. The partial product adder 44 adds the generated n number of partial products together until the number of partial products is reduced to two, and outputs two partial products finally obtained to the floating-point adder 7 and the fixed-point adder 8.

According to the embodiment, the partial product control circuit 42 for activating/deactivating the partial product generation circuit 41 is provided. The partial product control circuit 42 is connected to the mask register 3 and receives from the mask register 3 the mask bits MASK associated with the first mantissa part MNT1 and the second mantissa part MNT2. The partial product control circuit 42 also receives the above-mentioned multiplication command MC. The partial product control circuit 42 generates an enable signal ENB on the basis of the multiplication command MC and the mask bits MASK. The enable signal ENB is a signal for activating/deactivating the partial product generation circuit 41. The enable signal ENB is sent from the partial product control circuit 42 to the partial product generation circuit 41. According to the embodiment, a plurality of types of enable signals ENB are prepared, as described below in detail in the second section.

The fixed-point adder 8 is connected to the multiplication circuit 4 and the selection circuit 12. The fixed-point adder 8 adds together in fixed-point form the above-mentioned two partial products output from the multiplication circuit 4. The fixed-point adder 8 outputs effective figures in the result of this addition to the selection circuit 12. This output from the fixed-point adder 8 is a fixed-point multiplication result MNT_FX (the mantissa part in the fixed-point multiplication result).

The floating-point adder 7 is connected to the multiplication circuit 4, the 0 counter 9 and the normalization and rounding circuit 10. The floating-point adder 7 adds together in the floating-point form the above-mentioned two partial products output from the multiplication circuit 4. The floating-point adder 7 then outputs the result of this addition to the 0 counter 9 and to the normalization and rounding circuit 10. The 0 counter 9 is connected to the floating-point adder 7, the normalization and rounding circuit 10 and the exponential part correction circuit 11. The 0 counter 9 counts the number of successive bits from the most significant bit (MSB) in the output from the floating-point adder 7 and outputs the count value to the normalization and rounding circuit 10 and to the exponential part correction circuit 11. The normalization and rounding circuit 10 is connected to the floating-point adder 7, the 0 counter 9 and the selection circuit 12. The normalization and rounding circuit 10 performs normalization of the output from the floating-point adder 7 on the basis of the count value (shift number) output from the 0 counter 9. Further, the normalization and rounding circuit 10 performs rounding processing and outputs the result of this processing to the selection circuit 12. This output from the normalization and rounding circuit 10 is a mantissa part MNT_FL in the result of floating-point multiplication.

The exponential part adder 6 is connected to the preprocessing circuits 5 and the exponential part correction circuit 11. The exponential part adder 6 receives the exponential parts EXP1 and EXP2 output from the preprocessing circuits 5, determines the signs and adds the exponents together. The exponential part adder 6 outputs an exponential part EXP as the result of this addition to the exponential part correction circuit 11. The exponential part correction circuit 11 is connected to the exponential part adder 6, the 0 counter 9 and the selection circuit 12. The exponential part correction circuit 11 corrects the exponential part EXP according to the count value (shift number) output from the 0 counter 9 and outputs the result of this processing to the selection circuit 12. This output from the exponential part correction circuit 11 is an exponential part EXP' in the result of floating-point multiplication.

The selection circuit 12 is connected to the mask register 3, the fixed-point adder 8, the normalization and rounding circuit 10 and the exponential part correction circuit 11. The selection circuit 12 receives the multiplication command MC, the mask bit MASK, the mantissa part MNT_FX, the mantissa part MNT_FL and the exponential part EXP'. In a case where the mask bit MASK designates effectiveness ("1"), and where the multiplication command MC designates floating-point multiplication, the selection circuit 12 selects the mantissa part MNT_FL output from the normalization and rounding circuit 10 and connects the mantissa part MNT_FL and the exponential part EXP' to each other. A floating-point multiplication result is thereby produced. In a case where the mask bit MASK designates effectiveness, and where the multiplication command MC designates fixed-point multiplication, the selection circuit 12 selects the mantissa part MNT_FX output from the fixed-point adder 8 and sets the mantissa part MNT_FX as a fixed-point multiplication result. The produced floating-point multiplication result or fixed-point multiplication result is the result of multiplication between the first operand OP1 and the second operand OP2. The selection circuit 12 outputs result data RES representing the result of the multiplication. When the mask bit MASK designates ineffectiveness ("0"), the selection circuit 12 sets each value in the result data RES to 0. Thus, the multiplication between the first operand OP1 and the second operand OP2 is masked with the mask bit MASK.

2. Multiplication Circuit

Figure 2:
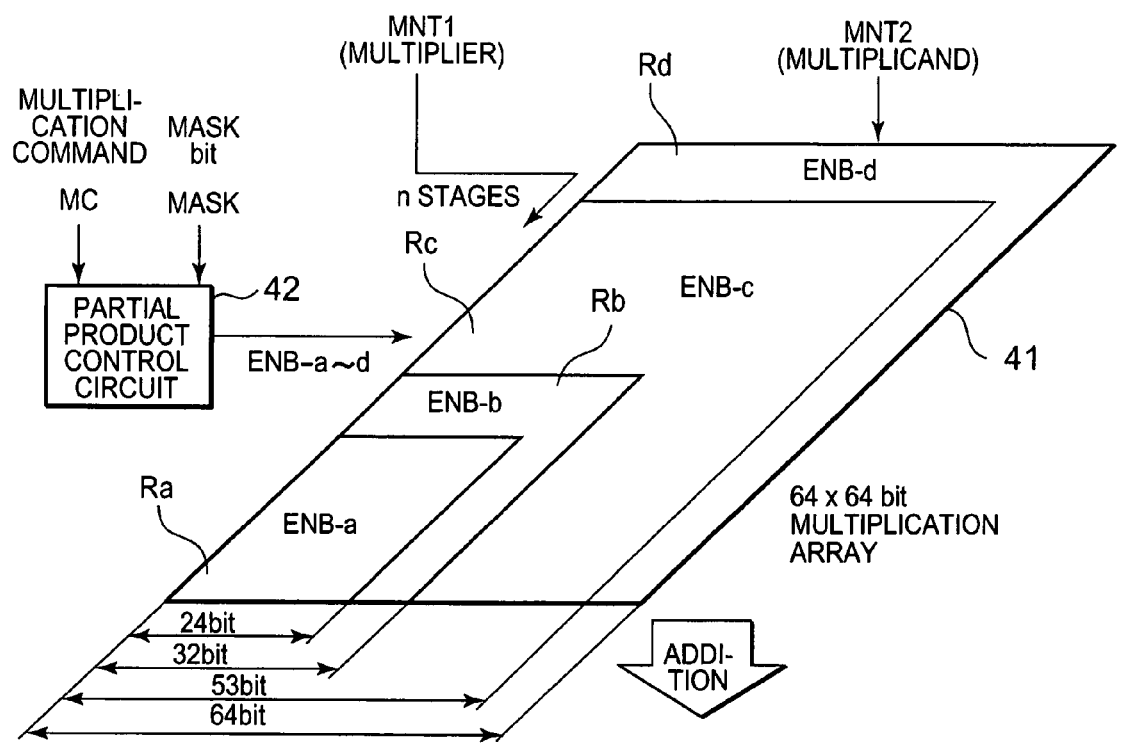
FIG. 2 is a diagram for explaining a multiplication circuit according to the embodiment of the present invention.

The multiplication circuit 4 according to the embodiment will be described in detail with reference to FIG. 2. The above-described partial product generation circuit 41 is a "multiplication array" in which multiplication between an n-bit multiplier and an n-bit multiplicand is performed. As described above, the first mantissa part MNT1 associated with the operand OP1 is input as a multiplier, and the second mantissa part MNT2 associated with the operand OP2 is input as a multiplicand. In this multiplication array, multiplication between one bit of a multiplier and a multiplicand is performed to produce a partial product in one stage. Multiplication is performed with respect to all the bits of the multiplier to generate partial products in n stages. The partial products in the n stages are arranged like figures written down on paper in calculation, as shown in FIG. 2. The product is obtained by adding together the partial products in the n stages.

The partial product generation circuit 41 is, for example, 64×64-bit multiplication array (n=64). Accordingly, there is a need to prepare 64-bit numbers as a multiplier and a multiplicand. The format of the multiplier and multiplicand depends on the format of the operands. In the vector multiplier according to the embodiment, four formats shown below are supported.

(1) 64-bit Fixed-point Form

Figure 3:
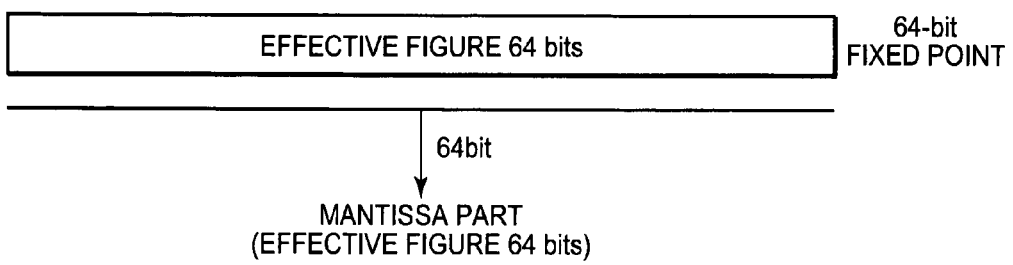
FIG. 3 is a diagram schematically showing a 64-bit fixed-point format.
Figure 4:
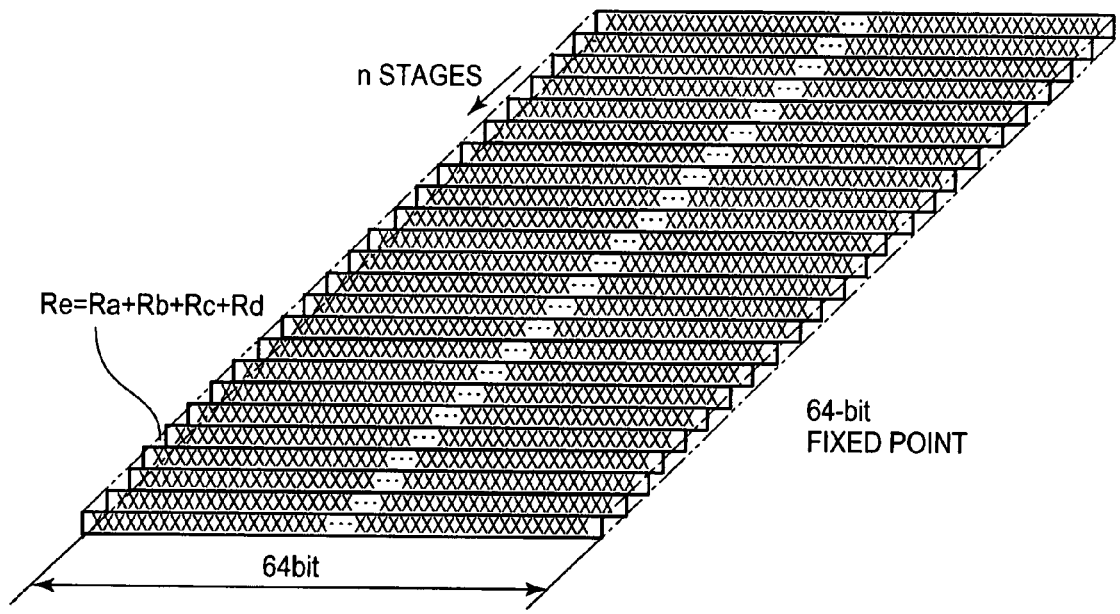
FIG. 4 is a diagram schematically showing a multiplication array in the case of 64-bit fixed-point multiplication.

FIG. 3 shows a 64-bit fixed-point format. In this case, the entire 64-bit operand is the 64-bit mantissa part MNT1 or MNT2. 64-bit mantissa parts MNT1 and MNT2 are input as a multiplier and a multiplicand to the multiplication array. FIG. 4 shows a multiplication array in the case of 64-bit fixed-point multiplication. Since all the 64 bits are effective figures, no unused region Rx (in which the value is fixed at 0) exists and the entire region in the multiplication array is an effective region Re. Referring to regions Ra to Rd shown in FIG. 2, the effective region Re is expressed as "Re=Ra+Rb+Rc+Rd".

(2) 32-bit Fixed-point Form

Figure 5:
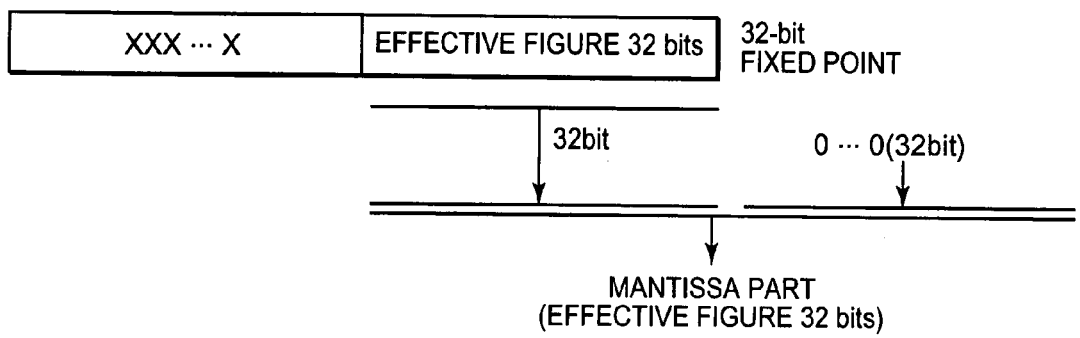
FIG. 5 is a diagram schematically showing a 32-bit fixed-point format.
Figure 6:
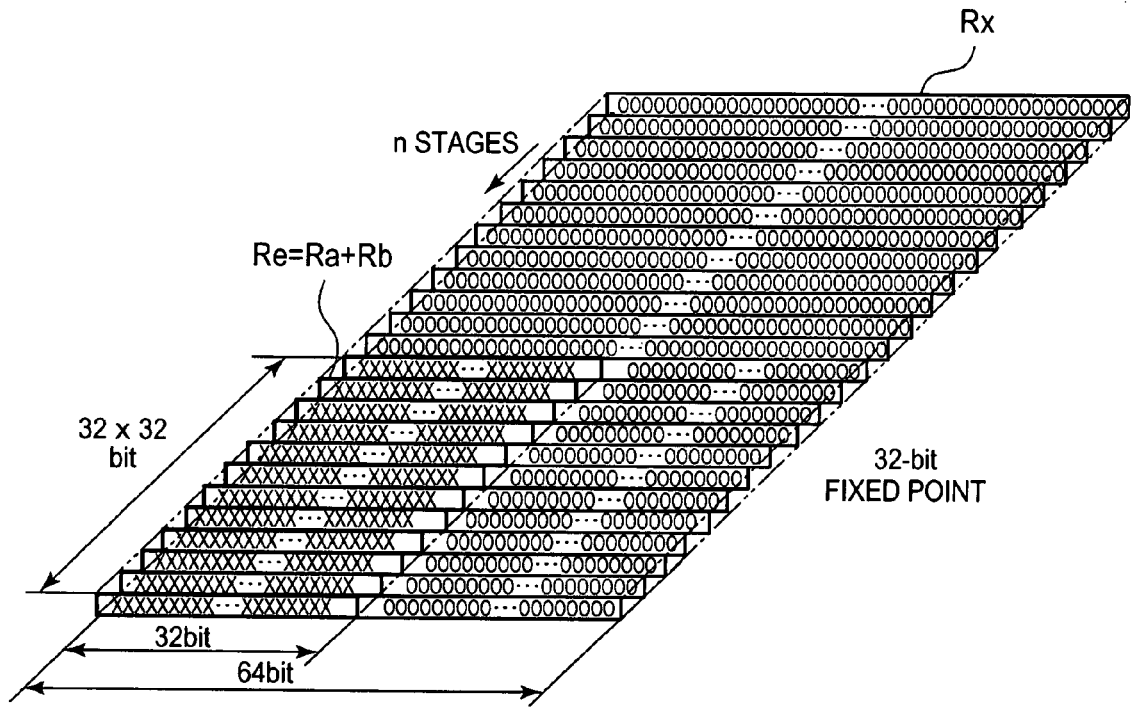
FIG. 6 is a diagram schematically showing a multiplication array in the case of 32-bit fixed-point multiplication.

FIG. 5 shows a 32-bit fixed-point format. In this case, the effective figures of each operand are only 32 bits. Accordingly, "0s" for 32 bits are added below the effective 32 bits. 64-bit mantissa part MNT1 or MNT2 is thereby formed. 64-bit mantissa parts MNT1 and MNT2 thus formed are input as a multiplier and a multiplicand to the multiplication array. FIG. 6 shows a multiplication array in the case of 32-bit fixed-point multiplication. In this case, the effective figures of each operand are only 32 bits. Accordingly, the effective region Re corresponding to the effective figures of the multiplier and multiplicand in the multiplication array is expressed as "Re=Ra+Rb" (see FIG. 2). The other region, i.e., the region corresponding to the lower 32 bits of the multiplier or the multiplicand, is the unused region Rx. Referring to FIG. 6, the region occupying about 75% of the entire multiplication array is the unused region Rx.

(3) Double-precision Floating-point Form

Figure 7:
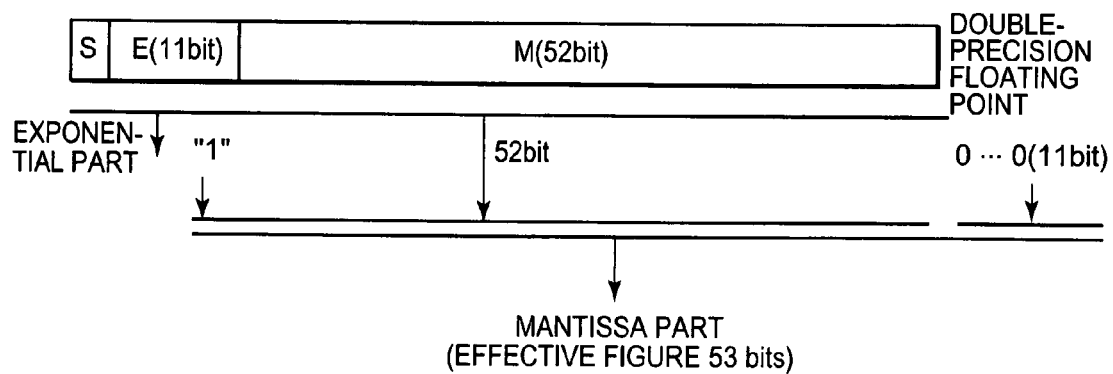
FIG. 7 is a diagram schematically showing a double-precision floating-point format.
Figure 8:
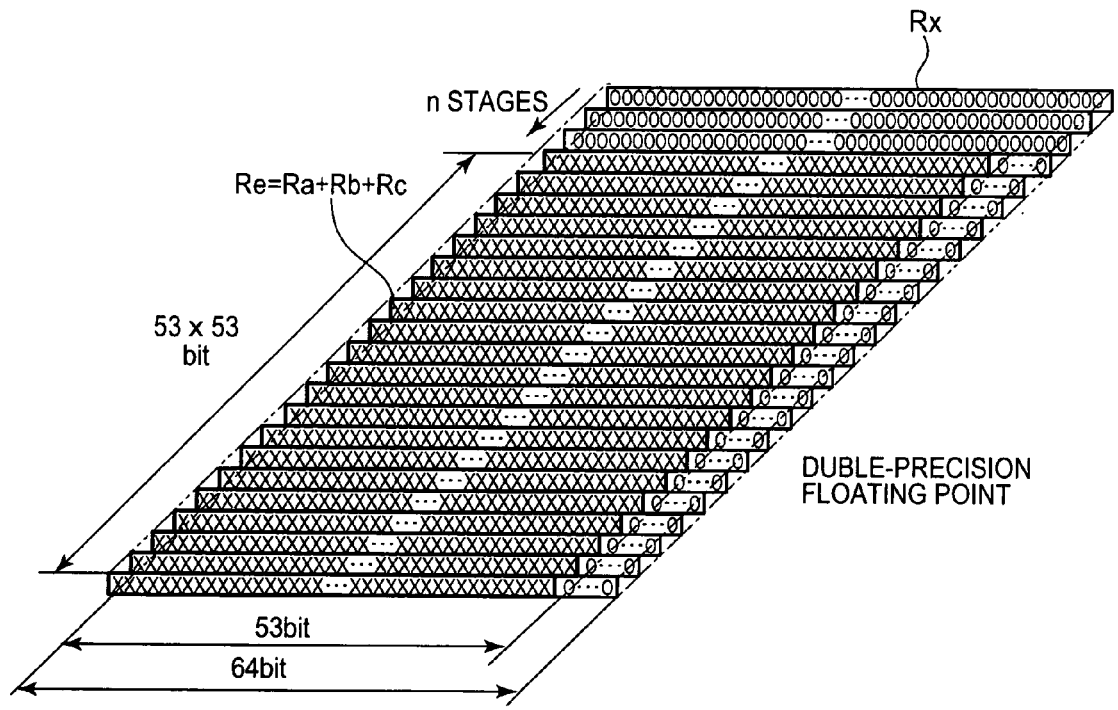
FIG. 8 is a diagram schematically showing a multiplication array in the case of double-precision floating-point multiplication.

FIG. 7 shows a double-precision floating-point format. In this case, the 64-bit operand includes a sign S (1 bit), an exponent E (11 bits) and a mantissa M (52 bits). The sign S and the exponent E become the exponential part EXP1 or EXP2. On the other hand, a hidden bit "1" is added in front of the 52-bit mantissa M, and "0s" for 11 bits are added below the 52-bit mantissa M. 64-bit mantissa part MNT1 or MNT2 is thereby formed. 64-bit mantissa parts MNT1 and MNT2 thus formed are input as a multiplier and a multiplicand to the multiplication array. FIG. 8 shows a multiplication array in the case of double-precision floating-point multiplication. In this case, the effective figures are upper 53 bits, and the effective region Re corresponding to the effective figures of the multiplier and multiplicand in the multiplication array is expressed as "Re=Ra+Rb+Rc" (see FIG. 2). The other region, i.e., the region corresponding to the lower 11 bits of the multiplier or the multiplicand, is the unused region Rx. Referring to FIG. 8, the region occupying about 31% of the entire multiplication array is the unused region Rx.

(4) Single-precision Floating-point Form

Figure 9:
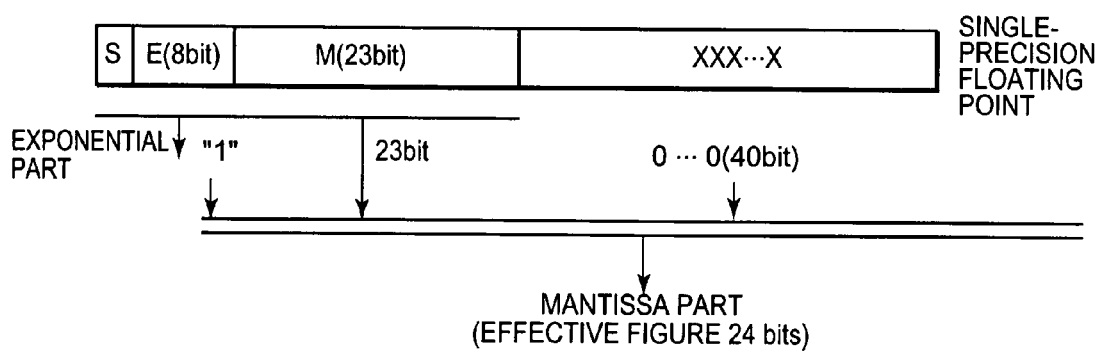
FIG. 9 is a diagram schematically showing a single-precision floating-point format.
Figure 10:
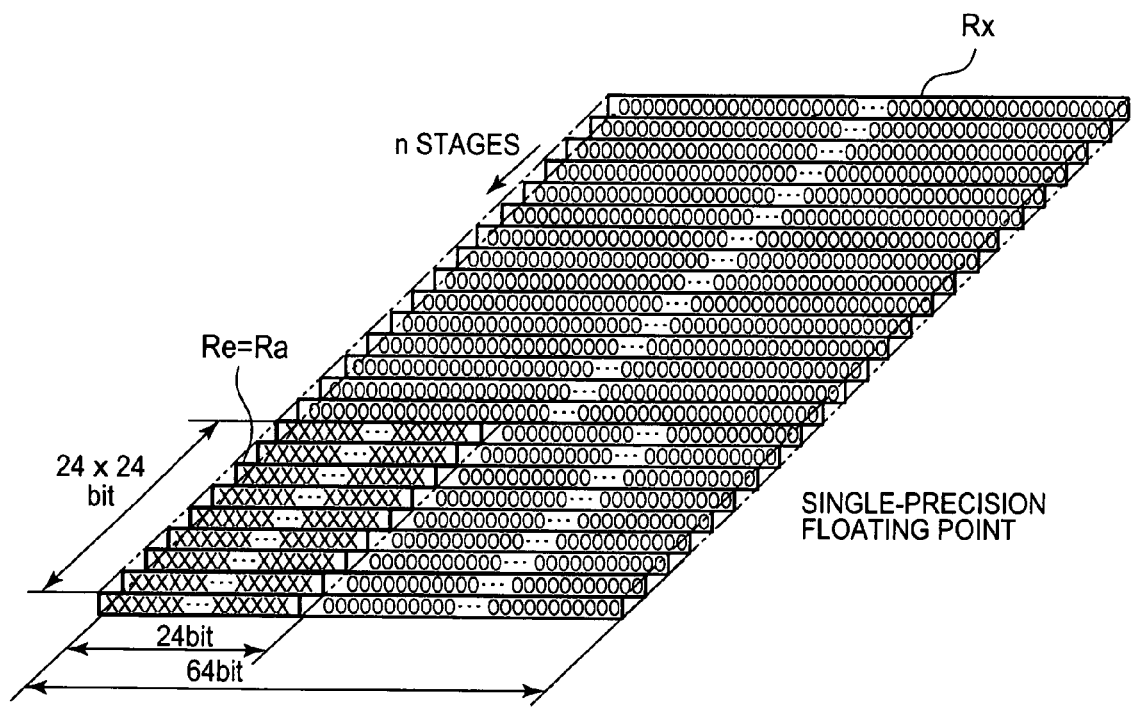
FIG. 10 is a diagram schematically showing a multiplication array in the case of single-precision floating-point multiplication.

FIG. 9 shows a single-precision floating-point format. In this case, the 32-bit operand includes a sign S (1 bit), an exponent E (8 bits) and a mantissa M (23 bits). The sign S and the exponent E become the exponential part EXP1 or EXP2. On the other hand, a hidden bit "1" is added in front of the 23-bit mantissa M, and "0s" for 40 bits are added below the 23-bit mantissa M. 64-bit mantissa part MNT1 or MNT2 is thereby formed. 64-bit mantissa parts MNT1 and MNT2 thus formed are input as a multiplier and a multiplicand to the multiplication array. FIG. 10 shows a multiplication array in the case of single-precision floating-point multiplication. In this case, the effective figures are upper 24 bits, and the effective region Re corresponding to the effective figures of the multiplier and multiplicand in the multiplication array is expressed as "Re=Ra" (see FIG. 2). The other region, i.e., the region corresponding to the lower 40 bits of the multiplier or the multiplicand, is the unused region Rx. Referring to FIG. 10, the region occupying about 86% of the entire multiplication array is the unused region Rx.

As described above, the effective figures of a multiplier and a multiplicand change depending on the format. That is, the effective region Re and the unused region Rx change depending on the format.

The multiplication circuit 4 is formed of a dynamic CMOS circuit in many cases. In such a case, there is a possibility of the circuit being operated at all times in the unused region Rx in the multiplication array by an output clock signal CLK. In the partial product adder 44 in the rear stage, there is also a possibility of addition processing being performed at all times with respect to the output result from the unused region Rx. These phenomena lead to an increase in power consumption. According to the embodiment, to limit the increase in power consumption, the enable signal ENB by which the effective region Re is activated according to the format is provided.

More specifically, referring to FIG. 2, four types of enable signals ENB-a to ENB-d are provided. The enable signals ENB-a to ENB-d are signals each for activating the corresponding one of the regions Ra to Rd. The enable signals ENB-a to ENB-d are input to the regions Ra to Rd, respectively. When the enable signal NB-a is effective ("1"), the region Ra is activated to operate the circuit therein. When the enable signal ENB-a is ineffective ("0"), the region Ra is deactivated to stop the operation of the circuit therein. Similarly, when the enable signal ENB-b (ENB-c, ENB-d) is effective ("1"), the region Rb (Rc, Rd) is activated to operate the circuit therein. When the enable signal ENB-b (ENB-c, ENB-d) is ineffective ("0"), the region Rb (Rc, Rd) is deactivated to stop the operation of the circuit therein.

In the case shown in FIG. 4 (64-bit fixed-point), all the enable signals ENB-a to ENB-d are set effective. In the case shown in FIG. 6, (32-bit fixed-point), the enable signals ENB-a and ENB-b are set effective, while the enable signals ENB-c and ENB-d are set ineffective. In the case shown in FIG. 8, (double-precision floating-point), the enable signals ENB-a to ENB-c are set effective, while the enable signal ENB-d is set ineffective. In the case shown in FIG. 10, (single-precision floating-point), only the enable signal ENB-a is set effective, while the enable signals ENB-b to ENB-d are set ineffective.

The partial product control circuit 42 shown in FIGS. 1 and 2 makes these enable signal ENB settings. Since the effective region Re depends on the format, the partial product control circuit 42 may refer to the multiplication command MC designating the format. That is, the partial product control circuit 42 according to the embodiment controls the status (effectiveness/ineffectiveness) of each of the enable signal ENB-a to ENB-d according to the multiplication command MC. Further, the partial product control circuit 42 may refer to the above-described mask bit MASK for making effective/ineffective the operation itself. When the mask bit MASK designates effectiveness ("1"), the partial product control circuit 42 controls the enable signals ENB-a to ENB-d on the basis of the multiplication command MC. When the mask bit MASK designates ineffectiveness ("0"), the partial product control circuit 42 sets each of the enable signals ENB-a to ENB-d ineffective regardless of the multiplication command MC, thereby deactivating the entire region of the multiplication array.

FIG. 11 outlines the enable signals ENB-a to ENB-d according to the embodiment. As shown in FIG. 11, the enable signal ENB is expressed by the logical product between the logical add of the multiplication command MC and the mask bit MC.

Figure 12:
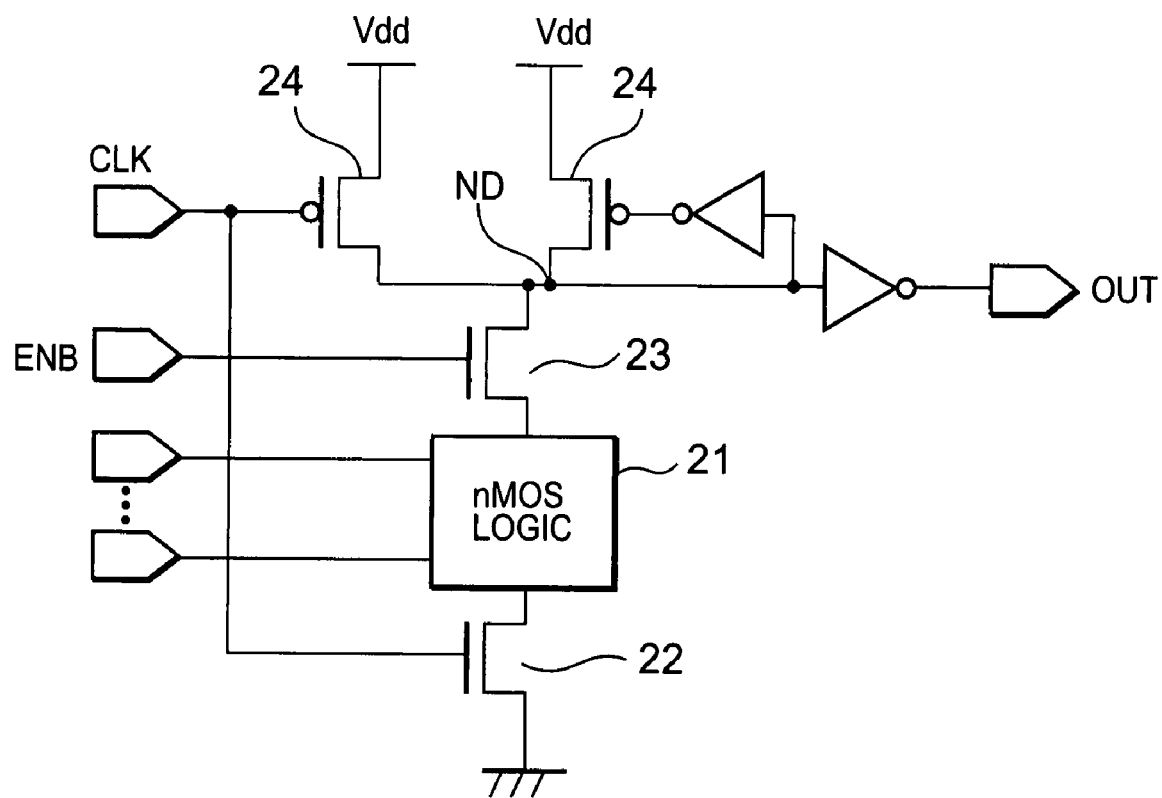
FIG. 12 is a circuit diagram showing the configuration of a dynamic circuit in an initial stage of the multiplication array.

The enable signals ENB-a to ENB-d generated by the partial product control circuit 42 are supplied to the corresponding regions Ra to Rd in the multiplication array. The multiplication array 41 according to the embodiment is constituted by a dynamic circuit suitable for a high-speed large-scale circuit. FIG. 12 shows the configuration of an initial-stage dynamic circuit of the multiplication array 41.

As shown in FIG. 12, the initial-stage dynamic circuit has an nMOS logic 21, an evaluation transistor 22, an enable switch 23 and a pMOS 24. The evaluation transistor 22 is an nMOS having the clock signal CLK input to its gate. The enable switch 23 is a switch which is turned on/off by the above-described enable signal ENB, e.g., an nMOS having the enable signal ENB input to its gate. The enable switch 23 performs switching between a dynamic node ND charged with electric charge and the nMOS logic 21. The nMOS logic 21, the evaluation transistor 22 and the enable switch 23 are connected in series.

A case where the enable signal ENB designates effectiveness ("1") will be considered. In this case, the enable switch 23 is turned on and the dynamic circuit operates. In the dynamic circuit, when the clock signal CLK is low, the pMOS 24 is on and the evaluation transistor 22 is off, so that the dynamic node ND is precharged to the power supply voltage Vdd. When the clock signal CLK becomes high, the pMOS 24 is turned off and the evaluation transistor 22 is turned on. At this time, if the logical input that turns off the nMOS logic 21 is being input, the potential on the dynamic node ND is still Vdd (high). If the logical input that turns on the nMOS logic 21 is being input, the charge on the dynamic node ND is discharged. After a lapse of a certain time period therefrom, the potential on the dynamic node ND becomes 0 V (low). Thus, the dynamic circuit repeats charging and discharging the dynamic node ND according to the clock signal CLK.

When the enable signal ENB is ineffective ("0"), the enable switch 23 is off. Accordingly, the discharging operation in the initial-stage dynamic circuit is completely stopped. As long as the enable signal ENB is ineffective, the output from the initial dynamic circuit is necessarily maintained at the low level. In a dynamic circuit in the following stage to which the output (0) from the initial dynamic circuit is input and dynamic circuits in the other following stages, 0 is input to the nMOS logic stage to inhibit the discharging operation. The discharging operations in the dynamic circuits in the following stages are successively inhibited in this way. As a result, the number of times the discharging operation is performed in the unused region Rx of the multiplication array (partial product generation circuit) 41 and the following stages is reduced, thus reducing the power consumption.

3. Examples of Operation

Examples of the operation of the vector multiplier according to the embodiment will be described with reference to the drawings already referred to.

3-1. 64-bit Fixed-point Number

Referring to FIG. 1, the multiplication command MC supplied to the preprocessing circuits 5, the multiplication circuit 4 and the selection circuit 12 is "64-bit fixed-point multiplication".

One of the preprocessing circuits 5 receives the first operand OP1 from the vector register 1 and generates the first exponential part EXP1 and the first mantissa part MNT1 according to the multiplication command MC. In the case of fixed-point multiplication, the first exponential part EXP1 is "0". Also, the first mantissa part MNT1 corresponds to all the 64 bits of the first operand OP1, as shown in FIG. 3. The preprocessing circuit 5 outputs the first exponential part EXP1 and the first mantissa part MNT1 to the exponential part adder 6 and the multiplication circuit 4, respectively. Similarly, the other preprocessing circuit 5 receives the second operand OP2 from the vector register 2 and outputs the second exponential part EXP2 and the second mantissa part MNT2 to the exponential part adder 6 and the multiplication circuit 4, respectively.

The partial product control circuit 42 generates the enable signal ENB on the basis of the multiplication command MC and the mask bit MASK and outputs the enable signal ENB to the partial product generation circuit 41. If the mask bit MASK designates effectiveness, all the enable signals ENB-a to ENB-d are set effective ("1"), as shown in FIG. 11. As a result, all the regions Ra to Rd become the effective region Re, as shown in FIGS. 2 and 4. In the effective region Re, the enable switch 23 in the initial-stage dynamic circuit is turned on and the initial-stage dynamic circuit operates at all times.

The partial product adder 44 adds the 64 partial products output from the partial product generation circuit 41 until the number of partial products is reduced to two, and outputs two partial products finally obtained to the floating-point adder 7 and the fixed-point adder 8. The fixed-point adder 8 adds together the two partial products and outputs the effective figure portion of the addition result to the selection circuit 12. This output from the fixed-point adder 8 is the fixed-point multiplication result RES. The selection circuit 12 selects the output from the fixed-point adder 8 according to the multiplication command MC and outputs the fixed-point multiplication result RES.

3-2. 32-bit Fixed-point Number

Referring to FIG. 1, the multiplication command MC supplied to the preprocessing circuits 5, the multiplication circuit 4 and the selection circuit 12 is "32-bit fixed-point multiplication".

One of the preprocessing circuits 5 receives the first operand OP1 from the vector register 1 and generates the first exponential part EXP1 and the first mantissa part MNT1. according to the multiplication command MC. The preprocessing circuit 5 generates the 64-bit first mantissa part MNT1 by adding "0s" for 32 bits below the effective figure 32 bits of the first operand OP1, as shown in FIG. 5. In the case of fixed-point multiplication, the first exponential part EXP1 is "0". The preprocessing circuit 5 outputs the first exponential part EXP1 and the first mantissa part MNT1 to the exponential part adder 6 and the multiplication circuit 4, respectively. Similarly, the other preprocessing circuit 5 receives the second operand OP2 from the vector register 2 and outputs the second exponential part EXP2 and the second mantissa part MNT2 to the exponential part adder 6 and the multiplication circuit 4, respectively.

The partial product control circuit 42 generates the enable signal ENB on the basis of the multiplication command MC and the mask bit MASK and outputs the enable signal ENB to the partial product generation circuit 41. If the mask bit MASK designates effectiveness, the enable signals ENB-a and ENB-b are set effective ("1"), while the enable signals ENB-c and ENB-d are set ineffective ("0"), as shown in FIG. 11. As a result, the regions Ra and Rb become the effective region Re, as shown in FIGS. 2 and 6. In the effective region Re, the enable switch 23 in the initial-stage dynamic circuit is turned on and the initial-stage dynamic circuit operates at all times. On the other hand, in the regions Rc and Rd (unused region Rx), the enable switch 23 in the initial-stage dynamic circuit is turned off. As a result, in the regions Rc and Rd, the discharging operation in the initial-stage dynamic circuit is completely stopped and the output is fixed at the low level. The discharging operation is also inhibited in the dynamic circuits in the following stages. Therefore the number of times the discharging operation is performed in the unused region Rx of the partial product generation circuit 41 and the partial product adder 44 is reduced, thus reducing the power consumption.

The partial product adder 44 adds the 64 partial products output from the partial product generation circuit 41 until the number of partial products is reduced to two, and outputs two partial products finally obtained to the floating-point adder 7 and the fixed-point adder 8. The fixed-point adder 8 adds together the two partial products and outputs the effective figure portion of the addition result to the selection circuit 12. This output from the fixed-point adder 8 is the fixed-point multiplication result RES. The selection circuit 12 selects the output from the fixed-point adder 8 according to the multiplication command MC and outputs the fixed-point multiplication result RES.

3-3. Double-precision Floating-point Number

Referring to FIG. 1, the multiplication command MC supplied to the preprocessing circuits 5, the multiplication circuit 4 and the selection circuit 12 is "double-precision floating-point multiplication".

One of the preprocessing circuits 5 receives the first operand OP1 from the vector register 1 and generates the first exponential part EXP1 and the first mantissa part MNT1 according to the multiplication command MC. The preprocessing circuit 5 generates the first exponential part EXP1 from the sign S (1 bit) and the exponent E (11 bits), as shown in FIG. 7. Also, the preprocessing circuit 5 generates the 64-bit first mantissa part MNT1 by adding a hidden bit "1" and "0s" for 11 bits to the 52-bit mantissa M. The preprocessing circuit 5 outputs the first exponential part EXP1 and the first mantissa part MNT1 to the exponential part adder 6 and the multiplication circuit 4, respectively. Similarly, the other preprocessing circuit 5 receives the second operand OP2 from the vector register 2 and outputs the second exponential part EXP2 and the second mantissa part MNT2 to the exponential part adder 6 and the multiplication circuit 4, respectively.

The partial product control circuit 42 generates the enable signal ENB on the basis of the multiplication command MC and the mask bit MASK and outputs the enable signal ENB to the partial product generation circuit 41. If the mask bit MASK designates effectiveness, the enable signals ENB-a to ENB-s are set effective ("1"), while the enable signal ENB-d is set ineffective ("0"), as shown in FIG. 11. As a result, the regions Ra to Rc become the effective region Re, as shown in FIGS. 2 and 8. In the effective region Re, the enable switch 23 in the initial-stage dynamic circuit is turned on and the initial-stage dynamic circuit operates at all times. On the other hand, in the region Rd (unused region Rx), the enable switch 23 in the initial-stage dynamic circuit is turned off. As a result, in the region Rd, the discharging operation in the initial-stage dynamic circuit is completely stopped and the output is fixed at the low level. The discharging operation is also inhibited in the dynamic circuits in the following stages. Therefore the number of times the discharging operation is performed in the unused region Rx of the partial product generation circuit 41 and the partial product adder 44 is reduced, thus reducing the power consumption.

The partial product adder 44 adds the 64 partial products output from the partial product generation circuit 41 until the number of partial products is reduced to two, and outputs two partial products finally obtained to the floating-point adder 7 and the fixed-point adder 8. The floating-point adder 7 adds together the two partial products and outputs the addition result to the 0 counter 9 and the normalization and rounding circuit 10. The 0 counter 9 counts the number of successive bits from the MSB in the output from the floating-point adder 7 and outputs the count value (shift number) to the normalization and rounding circuit 10 and to the exponential part correction circuit 11. The normalization and rounding circuit 10 performs normalization and rounding of the output from the floating-point adder 7 on the basis of the count value output from the 0 counter 9. The output from the normalization and rounding circuit 10 is the mantissa part MNT_FL in the floating-point multiplication result RES.

The exponential part adder 6 receives the exponential parts EXP1 and EXP2 output from the preprocessing circuits 5, determines the signs and adds the exponents together. The exponential part adder 6 then outputs the exponential part EXP as the addition result to the exponential part correction circuit 11. The exponential part correction circuit 11 corrects the exponential part EXP according to the count value output from the 0 counter 9. The output from the exponential part correction circuit 11 is the exponential part EXP' in the floating-point multiplication result RES.

The selection circuit 12 selects the mantissa part MNT_FL output from the normalization and rounding circuit 10 (floating-point adder 7) according to the multiplication command MC. The selection circuit 12 obtains the floating-point multiplication result RES by connecting the mantissa part MNT_FL and the exponential part EXP' to each other.

3-4. Single-precision Floating-point Number

Referring to FIG. 1, the multiplication command MC supplied to the preprocessing circuits 5, the multiplication circuit 4 and the selection circuit 12 is "single-precision floating-point multiplication".

One of the preprocessing circuits 5 receives the first operand OP1 from the vector register 1 and generates the first exponential part EXP1 and the first mantissa part MNT1 according to the multiplication command MC. The preprocessing circuit 5 generates the first exponential part EXP1 from the sign S (1 bit) and the exponent E (8 bits), as shown in FIG. 9. Also, the preprocessing circuit 5 generates the 64-bit first mantissa part MNT1 by adding a hidden bit "1" and "0s" for 40 bits to the 23-bit mantissa M. The preprocessing circuit 5 outputs the first exponential part EXP1 and the first mantissa part MNT1 to the exponential part adder 6 and the multiplication circuit 4, respectively. Similarly, the other preprocessing circuit 5 receives the second operand OP2 from the vector register 2 and outputs the second exponential part EXP2 and the second mantissa part MNT2 to the exponential part adder 6 and the multiplication circuit 4, respectively.

The partial product control circuit 42 generates the enable signal ENB on the basis of the multiplication command MC and the mask bit MASK and outputs the enable signal ENB to the partial product generation circuit 41. If the mask bit MASK designates effectiveness, the enable signal ENB-a is set effective ("1"), while the enable signals ENB-b to ENB-d is set ineffective ("0"), as shown in FIG. 11. As a result, only the region Ra becomes the effective region Re, as shown in FIGS. 2 and 10. In the effective region Re, the enable switch 23 in the initial-stage dynamic circuit is turned on and the initial-stage dynamic circuit operates at all times. On the other hand, in the regions Rb to Rd (unused region Rx), the enable switch 23 in the initial-stage dynamic circuit is turned off. As a result, in the regions Rb to Rd, the discharging operation in the initial-stage dynamic circuit is completely stopped and the output is fixed at the low level. The discharging operation is also inhibited in the dynamic circuits in the following stages. Therefore the number of times the discharging operation is performed in the unused region Rx of the partial product generation circuit 41 and the partial product adder 44 is reduced, thus reducing the power consumption.

The partial product adder 44 adds the 64 partial products output from the partial product generation circuit 41 until the number of partial products is reduced to two, and outputs two partial products finally obtained to the floating-point adder 7 and the fixed-point adder 8. The floating-point adder 7 adds together the two partial products and outputs the addition result to the 0 counter 9 and the normalization and rounding circuit 10. The 0 counter 9 counts the number of successive bits from the MSB in the output from the floating-point adder 7 and outputs the count value (shift number) to the normalization and rounding circuit 10 and to the exponential part correction circuit 11. The normalization and rounding circuit 10 performs normalization and rounding of the output from the floating-point adder 7 on the basis of the count value output from the 0 counter 9. The output from the normalization and rounding circuit 10 is the mantissa part MNT_FL in the floating-point multiplication result RES.

The exponential part adder 6 receives the exponential parts EXP1 and EXP2 output from the preprocessing circuits 5, determines the signs and adds the exponents together. The exponential part adder 6 outputs the exponential part EXP as the addition result to the exponential part correction circuit 11. The exponential part correction circuit 11 corrects the exponential part EXP according to the count value output from the 0 counter 9. The output from the exponential part correction circuit 11 is the exponential part EXP' in the floating-point multiplication result RES.

The selection circuit 12 selects the mantissa part MNT_FL output from the normalization and rounding circuit 10 (floating-point adder 7) according to the multiplication command MC. The selection circuit 12 then obtains the floating-point multiplication result RES by connecting the mantissa part MNT_FL and the exponential part EXP' to each other.

3-5. Mask Bit=Ineffectiveness

When the mask bit MASK designates ineffectiveness, all the enable signals ENB-a to ENB-d are set ineffective. As a result, in the all the regions Ra to Rd of the multiplication array, the discharging operation in the initial-stage dynamic circuit is completely stopped, thus reducing the power consumption. Also, the selection circuit 12 sets each value in the output result data RES to 0. Thus, the multiplication between the first operand OP1 and the second operand OP2 is masked with the mask bit MASK.

4. Advantages

According to the embodiment, the statuses of the plurality of types of enable signals ENB-a to ENB-d are controlled on the basis of the multiplication command MC and the mask bit MASK, thereby enabling the unused region Rx in the multiplication array 41 to be deactivated according to the format of the operand. More specifically, the discharging operation in the initial-stage dynamic circuit in the unused region Rx can be completely stopped. Further, the operation of the dynamic circuits following the initial-stage dynamic circuit in which the discharging operation is stopped is also inhibited. As a result, the power consumption of the multiplier handling a plurality of formats is reduced.

5. Vector-operation Arithmetic Unit

Figure 13:
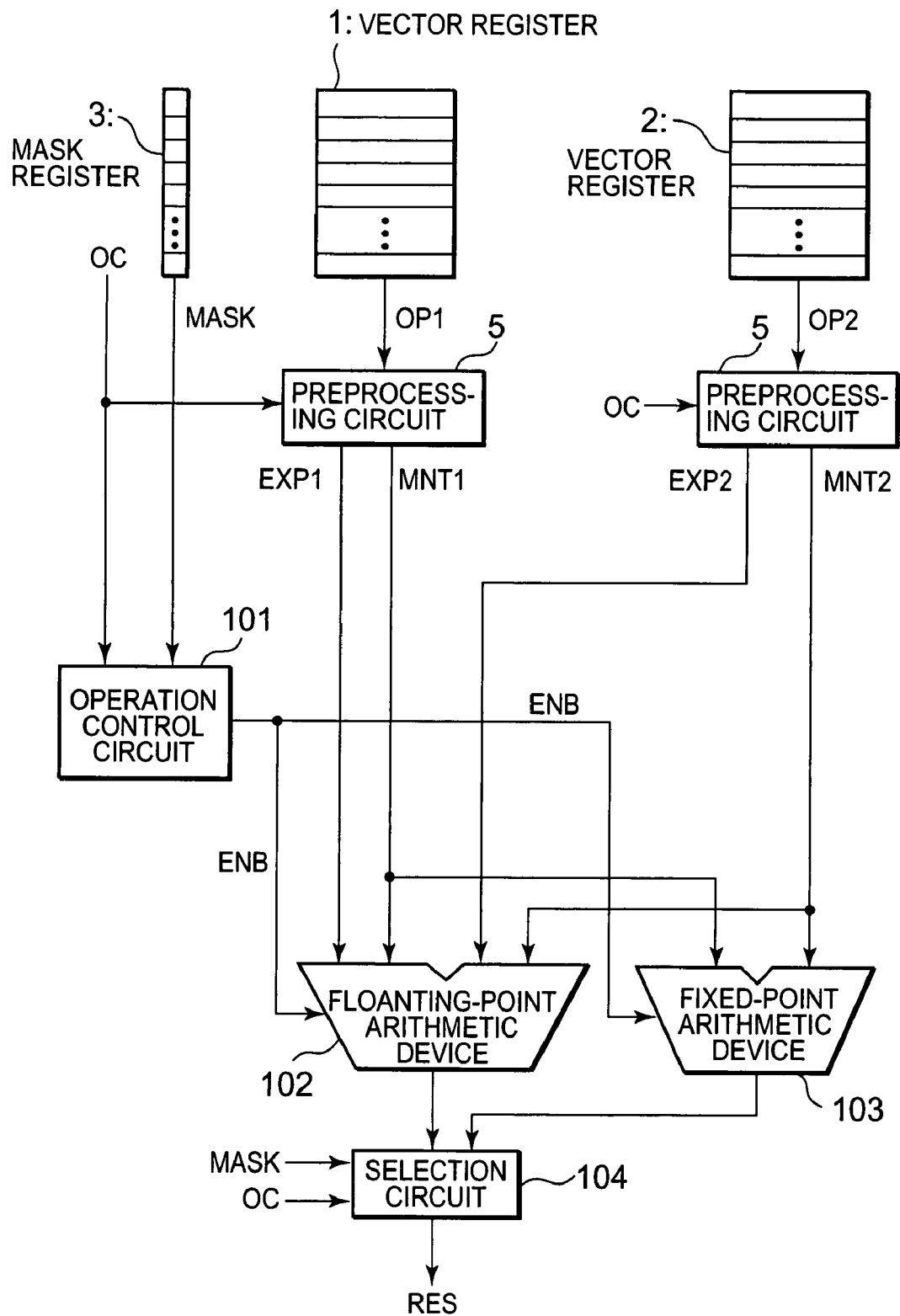
FIG. 13 is a block diagram showing the configuration of a vector-operation arithmetic unit according to the embodiment of the present invention.

The present invention can be applied to arithmetic units other than the multiplier. FIG. 13 shows an example of a vector-operation arithmetic unit to which the present invention is applied. This vector-operation arithmetic unit supports a plurality of data formats including floating-point and fixed-point formats. As shown in FIG. 13, the vector-operation arithmetic unit has a vector register 1, a vector register 2, a mask register 3, preprocessing circuits 5, an operation control circuit 101, a floating-point arithmetic device 102, a fixed-point arithmetic device 103 and a selection circuit 104.

The vector register 1, the vector register 2 and the mask register 3 are same as those shown in FIG. 1. Items of first vector data on which multiplication is to be performed are stored in the vector register 1. Each of the items of first vector data is a first operand OP1. Items of second vector data on which multiplication is to be performed are stored in the vector register 2. Each of the items of second vector data is a second operand OP2. Items of vector mask data are stored in the mask register 3. Each item of the vector mask data is a mask bit MASK. The mask bit MASK designate effectiveness/ineffectiveness of an operation between the first operand OP1 and the second operand OP2.

Each of the preprocessing circuits 5 receives an operation command OC designating the format of the operand. One of the preprocessing circuits 5 divides the first operand OP1 into a first exponential part EXP1 and a first mantissa part MNT1 on the basis of the operation command OC. The other preprocessing circuit 5 divides the second operand OP1 into a second exponential part EXP2 and a second mantissa part MNT2 on the basis of the operation command OC. The exponential parts EXP1 and EXP2 and the mantissa parts MNT1 and MNT2 are supplied to the floating-point arithmetic device 102 and the fixed-point arithmetic device 103.

The floating-point arithmetic device 102 performs a floating-point operation by using the exponential parts EXP1 and EXP2 and mantissa parts MNT1 and MNT2. The floating-point arithmetic device 102 corresponds to the multiplication circuit 4, the exponential part adder 6, the floating-point adder 7, the 0 counter 9, the normalization and rounding circuit 10 and the exponential part correction circuit 11 shown in FIG. 1. On the other hand, the fixed-point arithmetic device 103 performs a fixed-point operation by using the exponential parts EXP1 and EXP2 and mantissa parts MNT1 and MNT2. The fixed-point arithmetic device 103 corresponds to the multiplication circuit 4 and the fixed-point adder 8 shown in FIG. 1. The floating-point arithmetic device 102 and the fixed-point arithmetic device 103 are constituted by dynamic circuits.

The effective figures of the object on which operation is to performed in each of the arithmetic devices 102 and 103 depend on the format of the operand. An unused region Rx not used for operation occurs in each of the arithmetic devices 102 and 103 depending on the format of the operand. The region other than the unused region Rx, i.e. the region corresponding to the effective figures of the object of operation is an effective region Re. The effective region Re and the unused region Rx change depending on the format of the operand. To activate the effective region Re and to deactivate the unused region Rx, enable signals ENB are provided. The operation control circuit 101 generates the enable signals ENB and supplies the enable signals ENB to the arithmetic devices 102 and 103.

The operation control circuit 101 corresponds to the partial product control circuit 42 shown in FIG. 1. That is, the operation control circuit 101 controls the statuses of the enable signals ENB on the basis of the operation command OC and the mask bit MASK. The operation command OC designates the format of the operand. Therefore, the operation control circuit 101 can set effective the enable signal ENB supplied to the effective region Re and set ineffective the enable signal ENB supplied to the unused region Rx by referring to the operation command OC. When the mask bit MASK designates ineffectiveness, the operation control circuit 101 sets all the enable signals ENB ineffective.

The enable signals ENB are supplied to the initial-stage dynamic circuits provided in the arithmetic devices 102 and 103. As shown in FIG. 12, the initial-stage dynamic circuit has an enable switch 23 which is turned on/off by the enable signal ENB. When the enable signal ENB is ineffective, the enable switch 23 is off and the discharging operation is completely stopped. That is, the unused region Rx is deactivated and the discharge operation in the initial-stage dynamic circuit is completely stopped.

The selection circuit 104 corresponds to the selection circuit 102 shown in FIG. 1. The selection circuit 104 is connected to the mask register 3, the floating-point arithmetic device 102 and the fixed-point arithmetic device 103. The selection circuit 104 receives the floating-point operation result from the floating-point arithmetic device 102 and receives the fixed-point operation result from the fixed-point arithmetic device 103. When the mask bit MASK designates effectiveness, and when the operation command OC designates a floating-point operation, the selection circuit 104 selects the floating-point operation result. When the mask bit MASK designates effectiveness, and when the operation command OC designates a fixed-point operation, the selection circuit 104 selects the fixed-point operation result. The selection circuit 104 then outputs operation result data RES indicating the selected operation result. When the mask bit MASK designates ineffectiveness, the selection circuit 104 sets all the values in the output result data RES to 0. Thus, the operation between the first operand OP1 and the second operand OP2 is masked with the mask bit MASK.

According to the present invention, as described above, the statuses of the enable signals ENB are controlled according to the operation command OC and the mask bit MASK to enable the unused region Rx in the arithmetic devices 102 and 103 to be deactivated according to the format of the operand. More specifically, the discharging operation in the initial-stage dynamic circuit in the unused region Rx can be completely stopped. Further, the operation of the dynamic circuits following the initial-stage dynamic circuit in which the discharging operation is stopped can also be inhibited. Therefore, the power consumption of the arithmetic unit handling a plurality of formats is reduced.

What is claimed is:

1. A multiplier comprising:
a multiplication array in which partial products are generated by performing multiplication between an n-bit multiplier (n: a natural number) and an n-bit multiplicand;
an adder which adds the generated partial products together; and
a partial product control circuit which generates an enable signal for activating an effective region in the multiplication array corresponding to effective figures of the multiplier and the multiplicand,
wherein the effective figures depend on a format of the multiplier and the multiplicand, and the partial product control circuit controls a status of the enable signal according to a multiplication command designating the format,
wherein the multiplication array is constituted by a dynamic circuit; the dynamic circuit in an initial stage of the multiplication array has a switch which is turned on/off by the enable signal; and,
when the enable signal is ineffective, the switch is turned off and a discharging operation in the dynamic circuit is stopped.

2. The multiplier according to claim 1, wherein the enable signal comprises a first enable signal by which a first region in the multiplication array is activated and a second enable signal by which a second region in the multiplication array is activated; if the format of the multiplier and the multiplicand is a first format, the effective region is the first region and the partial product control circuit sets the first enable signal effective and sets the second enable signal ineffective; and,
if the format of the multiplier and the multiplicand is a second format, the effective region is the first region and the second region and the partial product control circuit sets the first and second enable signals effective.

3. The multiplier according to claim 1, wherein the format comprises a single-precision floating-point form, a double-precision floating-point form, a 32-bit fixed-point format and a 64-bit fixed-point form.

4. The multiplier according to claim 1, further comprising a mask register storing a mask bit designating effectiveness/ineffectiveness of the multiplication, wherein the partial product control circuit controls the status of the enable signal on the basis of the multiplication command and the mask bit, and sets the entire enable signal ineffective if the mask bit designates ineffectiveness.

5. The multiplier according to claim 4, further comprising:
a first register in which a first operand is stored;
a second register in which a second operand is stored;
a first preprocessing circuit; and
a second preprocessing circuit,
wherein the first preprocessing circuit divides the first operand into an exponential part and a mantissa part according to the multiplication command, and outputs the mantissa part of the first operand as the multiplier to the multiplication array; and the second preprocessing circuit divides the second operand into an exponential part and a mantissa part according to the multiplication command, and outputs the mantissa part of the second operand as the multiplicand to the multiplication array.

6. The multiplier according to claim 5, wherein the first register, the second register and the mask register are vector registers in which vector data is stored;
the first operand is each of items of first vector data stored in the first register;
the second operand is each of items of second vector data stored in the second register; and
the mask bit is each of items of vector mask data stored in the mask register and associated with the first operand and the second operand.

7. The multiplier according to claim 5, further comprising a selection circuit which receives an output from the adder and the mask bit, wherein the selection circuit generates result data indicating the result of multiplication between the first operand and the second operand on the basis of the output from the adder, and sets a value of the result data to 0 if the mask bit designates ineffectiveness.

8. The multiplier according to claim 7, wherein the adder comprises a fixed-point adder which adds together the partial products in fixed-point form, and a floating-point adder which adds together the partial products in floating-point form, wherein the selection circuit further receives the multiplication command, selects one of outputs from the fixed-point adder and the floating-point adder according to the multiplication command if the mask bit designates effectiveness, and generates the result data on the basis of the selected output.

9. A multiplier comprising:
a multiplication array which is constituted by a dynamic circuit, and in which partial products are generated by performing multiplication between a multiplier and a multiplicand;
an adder which adds the generated partial products together;
a mask register storing a mask bit designating effectiveness/ineffectiveness of the multiplication; and
a partial product control circuit which controls the status of an enable signal for activating the multiplication array on the basis of the mask bit,
wherein the partial product control circuit sets the enable signal ineffective if the mask bit designates ineffectiveness; the dynamic circuit in an initial stage of the multiplication array has a switch which is turned on/off by the enable signal; and, when the enable signal is ineffective, the switch is turned off and a discharging operation in the dynamic circuit is stopped.

10. The multiplier according to claim 9, further comprising:
a first register in which a first operand is stored;
a second register in which a second operand is stored;
a first preprocessing circuit which outputs a mantissa part of the first operand as the multiplier to the multiplication array; and
a second preprocessing circuit which outputs a mantissa part of the second operand as the multiplicand to the multiplication array,
wherein the first register, the second register and the mask register are vector registers in which vector data is stored; the first operand is each of items of first vector data stored in the first register;

the second operand is each of items of second vector data stored in the second register; and the mask bit is each of items of vector mask data stored in the mask register and associated with the first operand and the second operand.

11. An arithmetic unit comprising:

a first register in which a first operand is stored;

a second register in which a second operand is stored;

an arithmetic device which performs an operation by using the first operand and the second operand; and an operation control circuit which generates an enable signal for activating an effective region in the arithmetic device corresponding to effective figures of the first operand and the second operand, wherein the effective figures depend on the format of the first operand and the second operand, and the operation control circuit controls the status of the enable signal according to an operation command designating the format, wherein the arithmetic device is constituted by a dynamic circuit; the dynamic circuit in an initial stage of the arithmetic device has a switch which is turned on/off by the enable signal; and, when the enable signal is ineffective, the switch is turned off and a discharging operation in the dynamic circuit is stopped.

12. The arithmetic unit according to claim 11, further comprising a mask register storing a mask bit designating effectiveness/ineffectiveness of the operation, wherein the operation control circuit controls the status of the enable signal on the basis of the operation command and the mask bit, and sets the enable signal ineffective if the mask bit designates ineffectiveness.

13. The arithmetic unit according to claim 12, wherein the first register, the second register and the mask register are vector registers in which vector data is stored;

the first operand is each of items of first vector data stored in the first register; the second operand is each of items of second vector data stored in the second register; and the mask bit is each of items of vector mask data stored in the mask register and associated with the first operand and the second operand.

* * * * *